US008364104B2

(12) United States Patent
Cohen (10) Patent No.: US 8,364,104 B2
(45) Date of Patent: Jan. 29, 2013

(54) POWER CALIBRATION UNDER VOLTAGE STANDING WAVE RATIO CHANGE BY FREQUENCY SWEEP

(75) Inventor: Emanuel Cohen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 12/924,295

(22) Filed: Sep. 24, 2010

(65) Prior Publication Data

US 2012/0077450 A1 Mar. 29, 2012

(51) Int. Cl.
*H04B 1/04* (2006.01)
*H01Q 11/12* (2006.01)

(52) U.S. Cl. ............... 455/127.1; 455/115.1; 455/115.3; 455/522

(58) Field of Classification Search ............... 455/127.1, 455/115.1, 115.3, 522, 126, 127.2, 127.3, 455/13.4, 2; 330/296, 285, 278, 130, 291
See application file for complete search history.

(56) References Cited

U.S. PATENT DOCUMENTS

| 5,349,300 | A | * | 9/1994 | Matz et al. | 330/129 |
| 5,809,420 | A | * | 9/1998 | Ichiyanagi et al. | 455/103 |
| 5,937,011 | A | * | 8/1999 | Carney et al. | 375/297 |
| 6,438,360 | B1 | * | 8/2002 | Alberth et al. | 455/110 |
| 6,438,387 | B1 | * | 8/2002 | Ichikawa | 455/522 |
| 6,639,471 | B2 | * | 10/2003 | Matsuura et al. | 330/302 |
| 7,109,897 | B1 | * | 9/2006 | Levesque | 341/67 |
| 7,590,395 | B2 | * | 9/2009 | Buckley | 455/127.1 |
| 7,873,332 | B2 | * | 1/2011 | Behzad | 455/126 |
| 2005/0227646 | A1 | * | 10/2005 | Yamazaki et al. | 455/127.3 |
| 2005/0242879 | A1 | * | 11/2005 | Muller | 330/259 |
| 2006/0232338 | A1 | * | 10/2006 | Park et al. | 330/280 |
| 2008/0026710 | A1 | | 1/2008 | Buckley | |
| 2008/0139144 | A1 | | 6/2008 | Behzad | |

FOREIGN PATENT DOCUMENTS

| KR | 10-2001-0010345 A | 2/2001 |
| WO | 2012/040693 A1 | 3/2012 |

OTHER PUBLICATIONS

International Search Report and Written opinion received for PCT Patent Application No. PCT/US2011/053220, mailed on Feb. 27, 2012, 9 pages.

* cited by examiner

*Primary Examiner* — Pablo Tran
(74) *Attorney, Agent, or Firm* — Forefront IP Lawgroup, PLLC (57) ABSTRACT

A power calibration algorithm is performed on a wireless communication device, where power measurements are taken across frequency sweep at the output of the device and at a power amplifier of the device, to accurately track voltage standing wave ratio impedance and errors associated with VSWR impedance. The measurements are performed as part of production of the wireless communication device and during online operation of the wireless communication device. During online operation the measurements are made by a detector at the power amplifier over the various frequencies of the frequency sweep.

20 Claims, 6 Drawing Sheets

POWER CALIBRATION UNDER VOLTAGE STANDING WAVE RATIO CHANGE BY FREQUENCY SWEEP

BACKGROUND

For a wireless communication device, such as a broadband wireless communication device, calibration can be performed to assure that accurate radio frequency (RF) power is transmitted at an antenna connector of the wireless communication device. The calibration can be sensitive to the effects of impedance of the antenna connector. Such impedance can be referred to, or attributable to, voltage standing wave ratio (VSWR) effects.

A specific RF power is to be provided at the antenna connector, and particularly a specific RF power to be transmitted by an antenna of the wireless device. For transmitted power, a goal is make the transmitted power accurate, but there may be constraints to work around. The constraints can include regulatory standards as to operational minimum and maximum values of transmitted power, and consideration as to signal integrity, including signal linearity.

Change in VSWR can cause a significant error in transmitted power, leading to calibration errors; for example calibration errors of +/−2 dB. The effect of such calibration errors, can lead to having to provide for stronger and costlier power amplifiers, and in certain cases, to back off power to prevent regulatory violations regarding transmission. In such cases, significant costs and design issues can arise. It would be ideal to use less powerful power amplifiers to save power consumption, and avoid introducing additional components in order to reduce size of wireless communication devices.

The wireless communication device transmits desired signals and information at the antenna; however, VSWR changes can occur, and in RF terms, the antenna should be matched to a power amplifier providing the signals. If no matching is provided, problems can occur affecting the signals and information.

With typical calibration techniques, a significant window of error can exist, because of the unknown matching of the antenna and lines or coupling to the antenna. From the power amplifier, there can be considered an interface to the antenna. The interface can be defined by the lines, including a coupler that connects the power amplifier to the antenna. In certain cases, the coupler can be a detector that detects signals that are transmitted through the lines. The coupler can also be a sampler that samples actual power that is transmitted.

In certain cases, there can be a discrepancy as to the reading at the power amplifier and the reading of the power that is transmitted at the antenna. Existing detection methods can have considerable error (e.g., +/−2 dB), and the window of error between desired power transmission and actual transmission can be large. This can lead to problems in not having sufficient power to meet regulated power transmission, or having too much power as to regulated power transmission requirement. Either way, this leads to issues of power consumption and power size. In general, power performance issues are of concern. Therefore, there is need to improve power detection and calibration in wireless devices.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

In a wireless communication device (i.e., wireless communication system) that includes a wireless transmitter module, a calibration algorithm or procedure can be performed to measure power at the output, or antenna, of the wireless communication device, and at a detector of the wireless transmitter module. The power measurements can be performed across various frequencies (i.e., frequency sweep) to accurately track voltage standing wave ratio (VSWR) impedance and errors associated with VSWR impedance. The calibration measurements can be performed as part of production of the wireless communication device and during online operation of the wireless communication device. In certain implementations, during online operation the measurements can be made by the detector over the various frequencies and the measurements sent using a wireless communication interface, such as one of various implementations of the IEEE 802.11 standard (WiFi).

As part of the calibration or procedure, as frequency behavior is determined as to VSWR, correction can be performed by calibrating a difference between power measured by the detector and the power measured at the output or antenna. This correction can be performed in production. Furthermore, the detector reading can be converted to an output reading by performing a ripple factorization and frequency shift.

Example Wireless Communication Device

Figure 1:
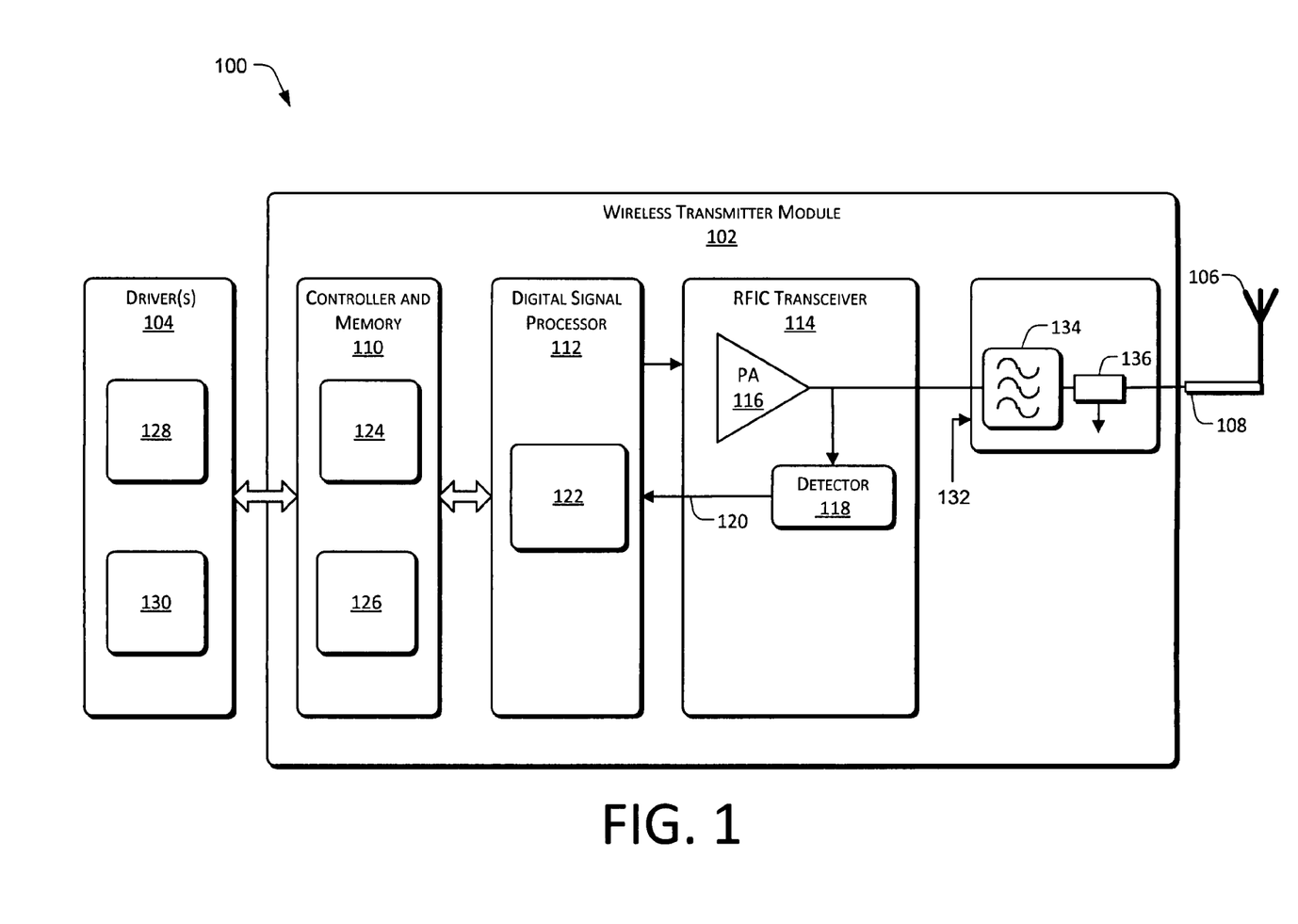
FIG. 1 is a block diagram of an example wireless communication device according to some implementations.

FIG. 1 shows an example wireless communication device 100. The wireless communication device 100 uses a calibration algorithm procedure to measure and adjust power to assure accurate power transmission.

The wireless communication device 100 can include broadband devices, such as laptops, net books, personal digital assistants (PDAs), e-readers, smart phones, etc. It is also contemplated that wireless communication device 100 can include voice only devices, such as cellular telephones.

In this implementation, the wireless communication device 100 includes a wireless transmitter module 102, and driver(s) 104. In certain cases, the wireless transmitter module 102 can be implemented in hardware, for example as part of an integrated circuit in silicon. The driver(s) 104 in certain cases can be implemented in software and/or firmware. The wireless device includes one or more antenna(e) 106 to receive and transmit RF powered signals. Lines or cables, as represented by connector 108, connect wireless transmitter module 102 with antenna(e) 106. Measurements can be taken at antenna(e) 106 for power output during production of the wireless communication device 100.

The wireless communication device 100 can further include one or more processor(s) (not shown) and memory (not shown), configured to communicate with and process the procedures of the described components of wireless communication device 100. In certain cases, driver(s) 104 can be implemented as part of the memory. The memory can include computer readable storage media configured to perform the described methods.

The wireless transmitter module can include a dedicated internal controller and memory 110, a digital signal processor (DSP) 112, and a radio frequency integrated circuit (RFIC) transceiver 114. The controller and memory 110 can include computer readable storage media. The RFIC transceiver 114 includes a power amplifier 116 and detector 118. The power amplifier 116 provides a signal at regulated power; the signal sent to antenna(e) 196. The regulated power provided by the power amplifier 116, can include power provided over different or sweeping frequencies. The detector 118 reads the power at power amplifier 116, and provides a signal on a look back chain or line 120. The detector 118 is configured to read signals over different RF power frequencies (i.e., frequency sweep).

Digital signal processor 112 includes a module 122 that reads the signal provided by the detector 118. Module 122 outputs the read data to controller and memory 110. Internal controller and memory 110 can include particular modules to process the data received from module 122. In this example, a module 124 provides/performs a ripple correction factor and frequency shift to adjust for power errors and calibration. Another module 126 provides a function that controls DSP 112 and RFIC transceiver 114 transactions, and data transfers to and from driver(s) 104.

In this example, the driver 104 includes a module 128 that can filter output data of the detector 118 (i.e., signal on look back chain line 120). The module further can reshape the output or reading of detector 118. Another module 130 can calculate expected power output. Since detector 118 measures power over different RF power frequencies (i.e., frequency sweep), different calculations are performed for different RF power frequencies.

The detector 118 can measure impedance change that is shown to the PA 116 or a change in VSWR, where the impedance change causes a channel. This measured change is shown at 132 of FIG. 1. The output of the PA 116 can be sent to and processed by a filter 134. In certain implementations, a directional coupler 136 can be included. The directional coupler 136 can be implemented to improve detected power accuracy versus VSWR change.

Calibration Algorithm Procedure

A calibration algorithm procedure can be performed based on different frequencies (i.e., frequency sweep) for the wireless communication device 100. Power output is measured at the output or antenna(e) 106, and by the detector 118. This measurement can be performed during production and during online (operation) of the wireless communication device 100.

The following equation (1) defines the calibration algorithm to derive actual transmitted power or Pdet_new_cal(f), where "f" represents a particular frequency:

$$Pdet\_new\_cal(f) = Pant\_cal\_ref(f) - Pdet\_real\_ref(f) + Pdet\_real\_corrected(f) \qquad (1)$$

Pant_cal_ref(f) describes frequency sweep of the measured output power in production, and averaged across frequency band with first level approximation or filtered response.

Pdet_real_ref(f) describes frequency sweep of the measured internal detector power (i.e., detector 118) in online operation and averaged across band with first level approximation or filtered response.

Pdet_real_corrected(f) describes frequency sweep of the measured internal detector power in online operation and peak to peak (PTP) ripple is extracted. For example, the PTP is reduced by a factor of approximately 2 to 2.5, and that data is phase shifted. Actual reduction factor and shift numbers can be defined in the "Engineering or Design Phase" of the wireless communication device 100. Therefore, Pdet_new_cal(f) can provide detector power (i.e., detector 118) that can better resemble actual power.

Figure 2:
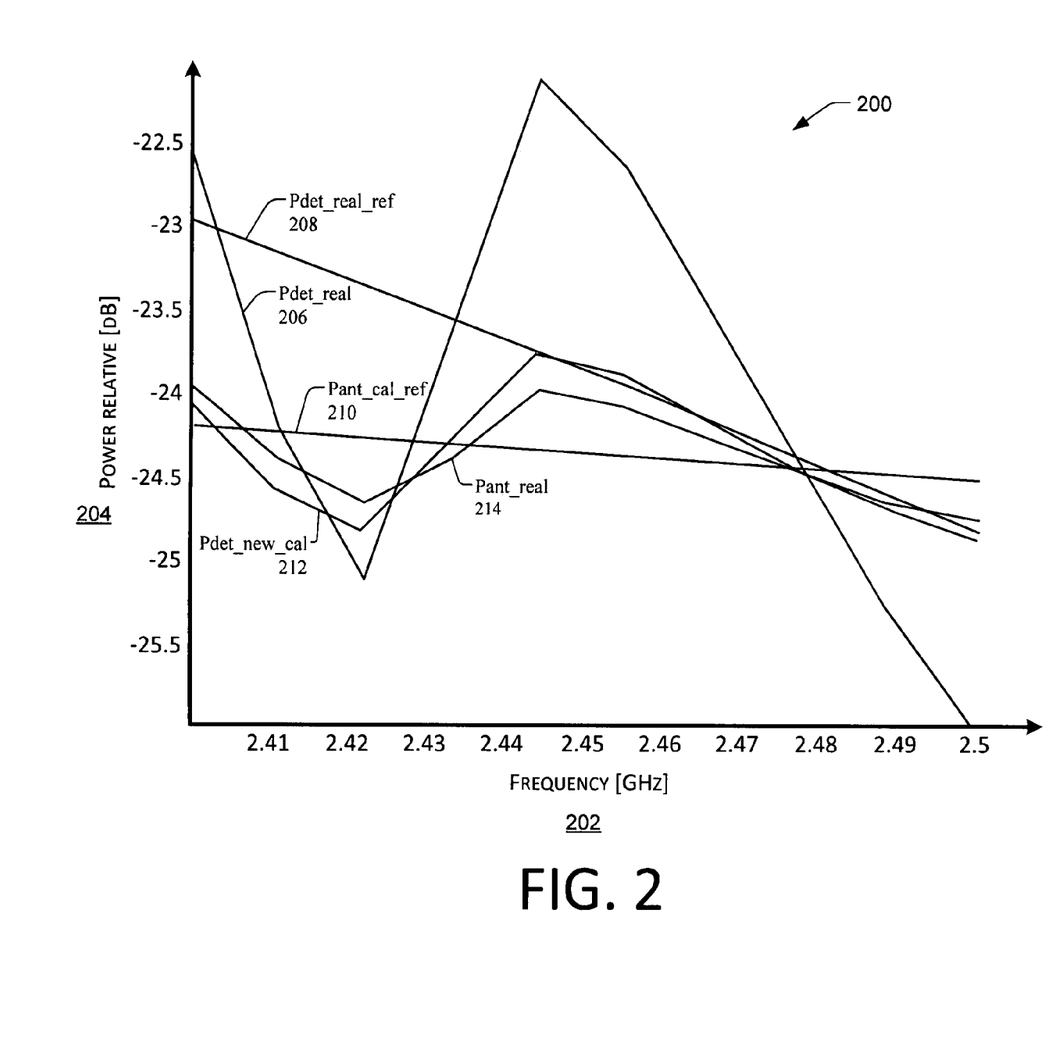
FIG. 2 is an example graph of performance that can be achieved using the calibration algorithm or procedure according to some implementations.

FIG. 2 shows a graph 200 illustrating performance that can be achieved using the calibration algorithm. Graph 200 plots frequency 202 versus power (relative power in decibels). The line 206 represents Pdet_real, which is the internal detector (e.g., detector 118) reading across various frequencies of power. The detector 118 can have a high ripple in its reading due to the VSWR of the antenna connector (i.e., connector 108). In order to get an accurate reading, the averaged reading of the detector 118 as represented by Pdet_real_ref, shown as line 208, and the average of the actual power from production as represented by Pant_cal_ref, shown as line 210, are subtracted to arrive at the power compensation needed from the detector 118 reading to the actual output at antenna(e) 106. The ripple of the detector is reduced by a factor of about 2, and the correction is added from the average. Actual transmitted power as represented by Pdet_new_cal is shown as line 212. In comparison output measured at the antenna is represented by Pant_real, as shown as line 214. A significant difference is seen between lines 212 and 214.

In summary, Pdet_real is the reading at the detector 118; Pant_real is the actual power delivered to the antenna(e) 106; Pdet_real−Pant_real is the difference that roughly describes the error in transmission of power; and Pdet_new_cal is actual power that is derived from the calibration algorithm procedure.

Two readings are taken, Pdet_cal_ref which is output at the antenna(e) 106 that is derived from production, and Pdet_real_ref which is the average signal of Pdet_real. This leads to determining or detecting ripple and shift in power, since when readings are made at the antenna(e) 106, there can be a large ripple because of mismatch and shift in total power. Pant ref and Pdet_real_ref show average power at the antenna(e) 106 and detector 118, and power shift and ripple. In addition, due to different interfaces (e.g., different and different values of connector 108), and filters (filter 134), etc. between the detector 118 and antenna(e) 106, there can be another factor to lead to ripple at the detector 118 and actual transmission at the antenna(e) 106.

Two separate calculations can be performed. One calculation constructs the average of the detector 118 reading to production reading and average error. A second calculation is to take the output signal from the detector (with peak) and reduce the signal by a factor that can be derived from the "Engineering" or "Design" phase of the wireless communication device 100. For example, the factor can be about 2 to 2.5 as discussed above.

The calibration algorithm procedure takes the ripple from the detector 118, and minimizes the ripple by the factor (e.g., factor equals 2 to 2.5). The factor can be used for different average power, based on average as determined in production. The result can adapt the average and adapt the ripple.

Therefore, mappings can be created as to detector 118 readings and actual power transmitted. The calibration algorithm procedure is performed over multiple frequencies, instead of a single point frequency to understand ripple effects, since a single point frequency does not show where ripple failure exists. Adjustments and changes can be made to impedance, and continuous recalibration can be performed.

Figure 3:
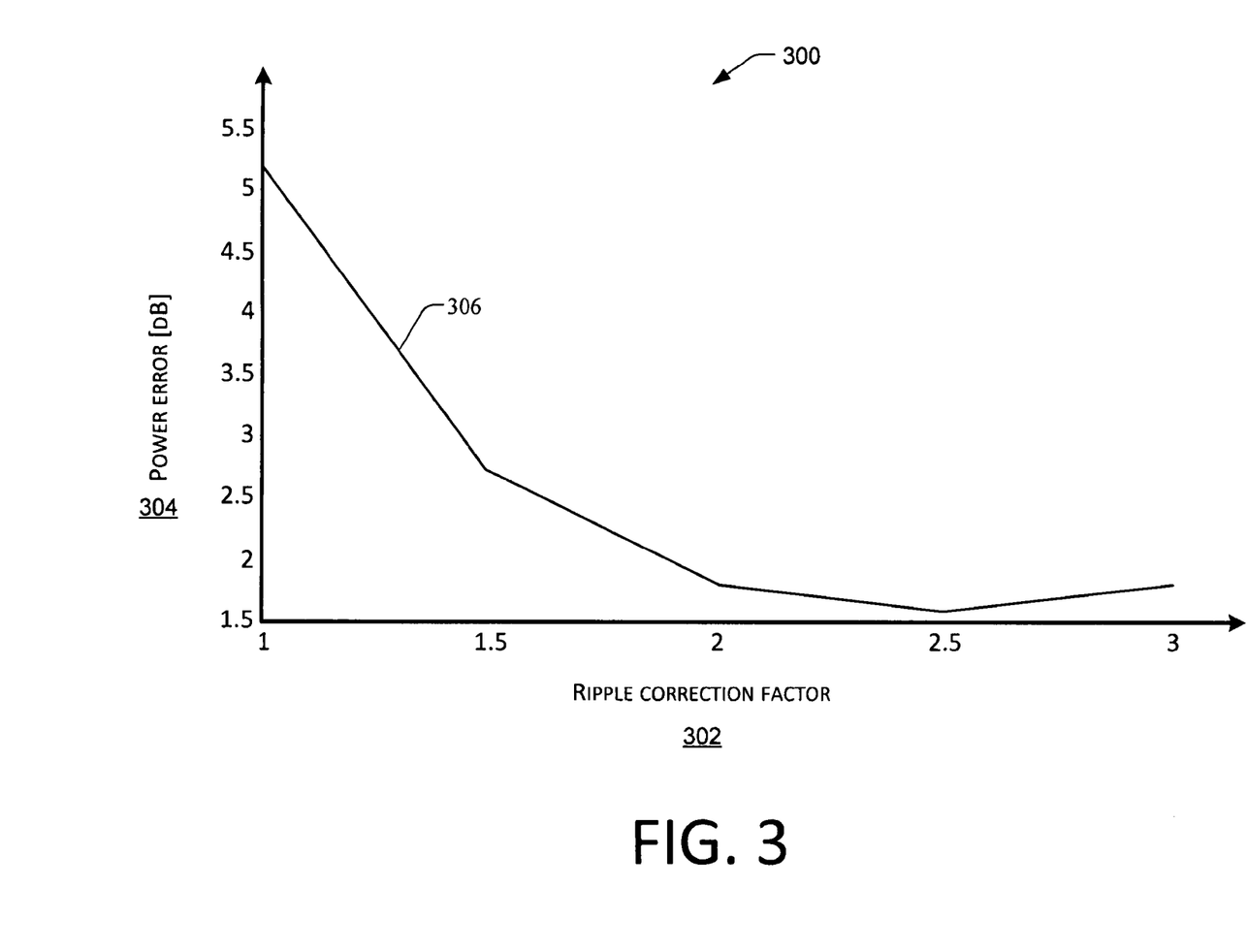
FIG. 3 is an example graph of ripple correction factors that can be chosen according to some implementations.

FIG. 3 shows a graph 300 illustrating example ripple correction factors that can be chosen. The power correction factor 302 is plotted against power error. Line 306 represents an example ideal function ripple correction factor to power error. It is known that a frequency sweep of power to an unmatched antenna port (i.e., VSWR change) can cause transmitted power to have ripple response. The detector 118 can be used to sample the actual power at antenna(e) 106 that can exhibit a ripple that is stronger that what is actuality transmitted by the ripple factor.

In this example, it is seen that around 2 to 2.5 an optimal correction factor can be observed. It is expected, that power at the detector 118 can have twice the sensitivity to output impedance compared to the output power at the antenna(e) 106. In an actual system; additional elements are expected between the detector 118 and the antenna connector 108 causing the factor to change a bit (i.e., shift of line 306).

Figure 4:
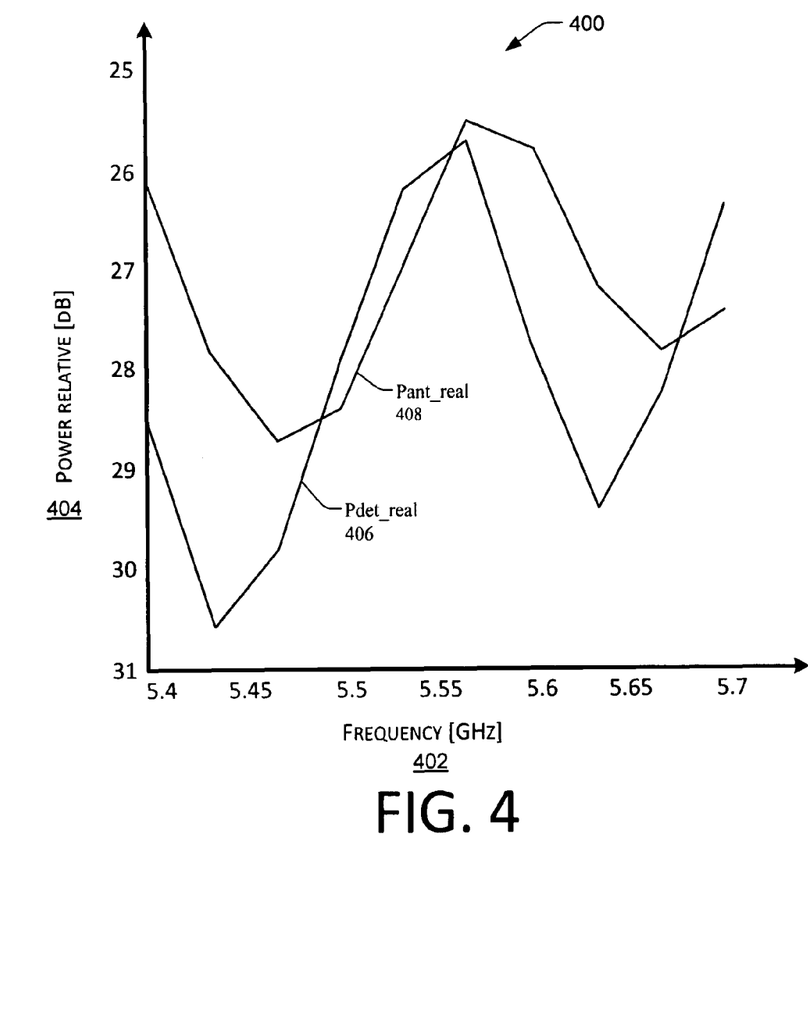
FIG. 4 shows a graph of phase shift between detector and output according to some implementations.

FIG. 4 shows a graph 400 illustrating phase shift between detector 118 and output at antenna(e) 106. Frequency 402 is plotted against relative power in decibels 404. The line 406 represents Pdet_real and the line 408 represents Pant_real. This can be a worst case scenario. For example, at 5 GHz, when filters, e.g., filter 134, can show poorer matching, there may be some observed shift in frequency between the ripple of the detector 118 and the output at the antennae 106. The observed phase shift is the shift of the ripple in frequency between the actual transmitted power to the sample point at the detector 118. This shift should be corrected in order to get an accurate calibration reading.

Figure 5:
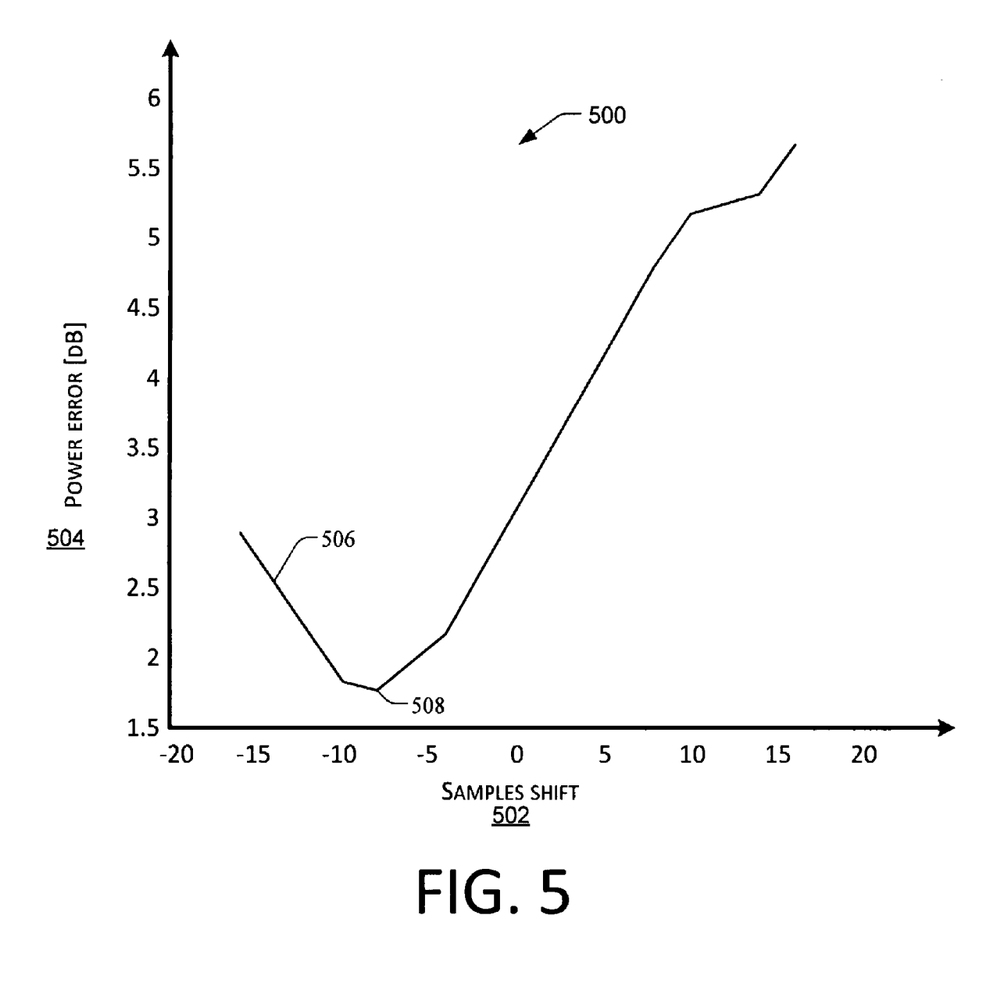
FIG. 5 shows a graph of correction of frequency shift according to some implementations.

FIG. 5 shows a graph 500 illustrating correction of frequency shift. Samples of shift 502 are plotted against power error to derive line 506. In this example, a final correction error 508 shows an approximately 1.7 dB peak to peak error.

Considering that wireless communication device 100 can include different components, and particularly different components up to the connector 108, a particular ripple coefficient and frequency shift can give a good fit between the detector 118 and the actual power output at the antenna, and calculated with different antenna connector 108 VSWR. To arrive an acceptable averaging for calibration, the peak value should be derived for variation of impedance. For example, at 2.4 GHz, where the band limit is 100 Mhz, a total delay of 3 nanoseconds can be implemented. Such a delay may be for typical filters and cabling.

Figure 6:
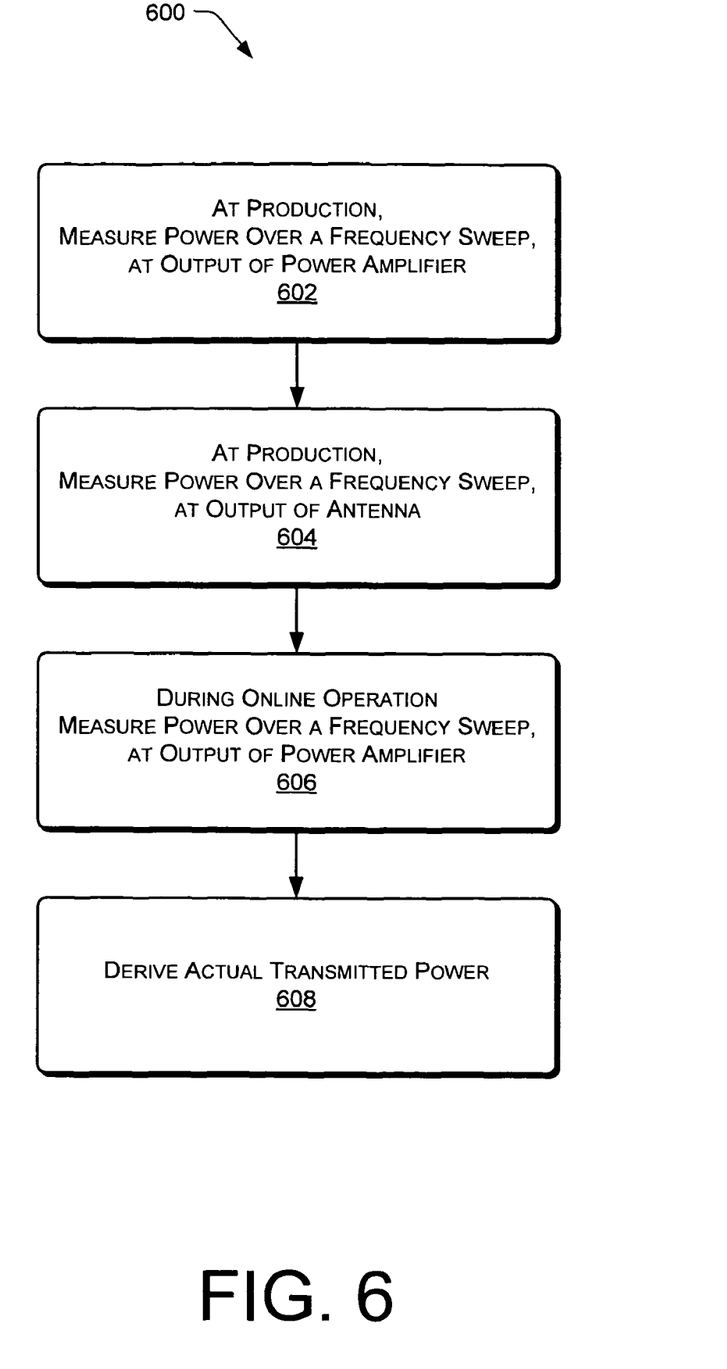
FIG. 6 is a flow chart for performing a calibration algorithm procedure according to some implementations.

FIG. 6 is a flow chart diagram 600 for an exemplary process of power calibration for a wireless communication device. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 602, measurement of power at the power amplifier is performed. This measurement can be performed by the internal detector 118 discussed above. The measurement is performed at various frequencies or over a frequency sweep. The measurement can performed during production of the wireless communication device. The measured data for example can be stored in controller and memory 110 described above.

At block 604, measurement of power at the output of the wireless communication device, or at the antenna of the wireless communication device. For example, the measurement is performed at the various frequencies (i.e., frequency sweep) and measured at connector at point 108 by external measurement equipment. The measured data for example can be stored in controller and memory 110 described above.

At block 606, during online operation, or actual operation of the wireless communication device, measurement of power at the power amplifier is performed. This measurement can be performed by the internal detector 118. In certain implementations, measurement readings can be received from the detector 118 by a wireless interface or scanning interface, such as one of the variations of the IEEE 802.11 standard. In particular, the IEEE 802.11 standard provides for a protocol with certain periods that allow for performing a frequency sweep (i.e., scanning) that does not consume dedicated air time for calibration.

At block 608, actual transmitted power is derived. This derivation can be performed using the calibration algorithm discussed above. In particular, actual transmitted power can be derived by following: the measured output power in production as measured in block 604 averaged across the frequency bands, subtracting the measured online output power of the power amplifier as measure in block 606 averaged across frequency bands, and adding the measured online output power of the power amplifier as measure in block 606 with peak to peak ripple extracted. This algorithmic process can be performed at driver(s) 104 (i.e., module 130) after the measured data is first processed in DSP 112, then transferred by controller and memory 110 to driver(s) 104. The result is fed back to DSP 112 for controlling the transmitted power of the wireless transmitter module 102.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the systems described could be configured as communication devices, computing devices, and other electronic devices.

What is claimed is:

1. A method of calibrating power of a wireless communication device comprising:

measuring output power of the wireless communication device over a frequency sweep during production of the wireless communication device;

measuring output power of a power amplifier of the wireless communication device over the frequency sweep during online operation of the wireless communication device; and deriving actual power transmitted by averaging measured output power of the wireless communication device over frequencies of the frequency sweep, subtracting measured power of the power amplifier averaged the frequencies; and adding the measured power of the power amplifier averaged the frequencies with peak to peak ripple extracted.

2. The method of claim 1, wherein the measuring output power of the wireless communication device is performed at one or more antennae of the wireless communication device.

3. The method of claim 1, wherein the measuring output power of the wireless communication device is performed with a direct link from the power amplifier to one or more antennae of the wireless communication device.

4. The method of claim 1, wherein the measuring output power of the wireless communication device is performed by a close loop detector internal to the wireless communication device.

5. The method of claim 1, wherein the measuring output power of the power amplifier of the wireless communication device over the frequency sweep during online operation addresses voltage standing wave ratio (VSWR) impedance.

6. The method of claim 1, wherein the measuring output power of the power amplifier of the wireless communication device over the frequency sweep during online operation accounts for interfaces between the power amplifier and one or more antennae.

7. The method of claim 1, wherein the deriving includes selecting a ripple correction factor.

8. The method of claim 1, wherein the deriving considers phase from a detector that measures output of the power amplifier and the output of the wireless communication device.

9. The method of claim 1, wherein the deriving uses a moving average calculation of power over the frequency sweep in production and online operation of the wireless communication device.

10. A wireless communication device comprising:
  a power amplifier;
  one or more antennae which receive signals from the power amplifier; and
  a detector that measures output at the power amplifier, wherein a calibration is performed as to power transmitted by the power amplifier, the calibration based on measuring output power over a frequency sweep during production of the wireless communication device at the one or more antennae, and online power measured by the detector.

11. The wireless communication device of claim 10, wherein the one or more antennae are connected to a connector, and measurement of the one or more antennae is performed at the connector.

12. The wireless communication device of claim 10, wherein the detector is a closed loop detector.

13. The wireless communication device of claim 10, wherein the detector further considers phase.

14. The wireless communication device of claim 10 further comprising a module to perform ripple correction and frequency shift to adjust for power errors.

15. The wireless communication device of claim 10 further comprising a module to calculate expected power output.

16. The wireless communication device of claim 10 further comprising a directional coupler to address voltage standing wave ratio change.

17. A method performed by a wireless communication device for power calibration comprising:
  determining output transmitted power of the wireless communication device during production over a frequency sweep;
  subtracting a measured output of a power amplifier over the frequency sweep, during online operation; and
  adding a measured output of a power amplifier over the frequency sweep wherein peak to peak ripple is extracted, to derive actual transmitted power of the wireless communication device.

18. The method of claim 17, wherein the determining output and subtracting a measured output is a first level approximation or based on a filtered response.

19. The method of claim 17, wherein the peak to peak ripple that is extracted is based on a predetermined ripple factor.

20. The method of claim 17, wherein output of the power amplifier is measure by a closed loop detector.

\* \* \* \* \*